(12) United States Patent
Miyahara et al.

(10) Patent No.: US 10,380,151 B2
(45) Date of Patent: Aug. 13, 2019

(54) INFORMATION PROCESSING TO SEARCH FOR RELATED EXPRESSIONS

(71) Applicant: SONY CORPORATION, Tokyo (JP)

(72) Inventors: Masanori Miyahara, Tokyo (JP); Kazunori Araki, Kanagawa (JP); Katsuyoshi Kanemoto, Chiba (JP); Ryo Nakahashi, Tokyo (JP); Kazuki Yoshiyama, Kanagawa (JP); Tomohiro Takagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 896 days.

(21) Appl. No.: 14/450,403

(22) Filed: Aug. 4, 2014

(65) Prior Publication Data
US 2015/0052140 A1 Feb. 19, 2015

(30) Foreign Application Priority Data
Aug. 13, 2013 (JP) .................................. 2013-168259

(51) Int. Cl.
*G06F 16/33* (2019.01)
*G06F 16/35* (2019.01)

(52) U.S. Cl.
CPC ........ *G06F 16/3338* (2019.01); *G06F 16/355* (2019.01)

(58) Field of Classification Search
None
See application file for complete search history.

(56) References Cited

U.S. PATENT DOCUMENTS

| | | | | |
|---|---|---|---|---|
| 5,325,298 A | * | 6/1994 | Gallant | G06F 17/274 704/9 |
| 6,446,061 B1 | * | 9/2002 | Doerre | G06F 17/3071 707/738 |
| 7,366,705 B2 | * | 4/2008 | Zeng | G06F 17/3071 706/20 |
| 9,286,391 B1 | * | 3/2016 | Dykstra | G06F 17/30864 |

(Continued)

FOREIGN PATENT DOCUMENTS

JP 2007-026425 A 2/2007

*Primary Examiner* — James Trujillo
*Assistant Examiner* — Kurt A Mueller
(74) *Attorney, Agent, or Firm* — Chip Law Group

(57) ABSTRACT

Disclosed is an information processing apparatus including an expression extraction unit, a feature extraction unit, a clustering unit, a related expression extraction unit, and an output unit. The expression extraction unit extracts a plurality of expressions from a plurality of documents. The feature extraction unit extracts feature amounts of the extracted respective expressions while distinguishing the expressions having the same notation. The clustering unit clusters the extracted respective expressions together while distinguishing the expressions having the same notation and calculates assignment degree vectors having assignment degrees of the respective expressions to two or more respective clusters as components. The related expression extraction unit extracts related expressions having the assignment degree vectors similar to those of a provided input expression while distinguishing the expressions having the same notation. The output unit outputs the related expressions and identification information for identifying the related expressions.

13 Claims, 16 Drawing Sheets

(56) References Cited

U.S. PATENT DOCUMENTS

| | | | |
|---|---|---|---|
| 2003/0126561 A1* | 7/2003 | Woehler | G06F 17/3071 |
| | | | 715/256 |
| 2008/0065623 A1* | 3/2008 | Zeng | G06F 17/30696 |
| 2010/0049708 A1* | 2/2010 | Kawai | G06F 17/30705 |
| | | | 707/748 |

* cited by examiner

| Expression appearance position ID | Expression | Expression feature amounts |
|---|---|---|
| 12454 | Michael | drama, actor, TV... |
| 15635 | Mike | star, perform, character,... |
| 27352 | baseball | hit, homerun, victory |
| 31595 | Mike | player, stadium, base,... |
| 32608 | Michael | steal, outfielder, bat,... |
| 42959 | news | suspect,murder,crime,... |
| ... | ... | ... |

| Expression appearance position ID | Expression | Assignment degree vectors |
|---|---|---|
| 15816 | stadium | (0.62, 0.05, 0.12, ...) |
| 73525 | Michael | (0.74, 0.02, 0.17, ...) |
| 52882 | Michael | (0.63, 0.12, 0.10, ...) |
| 74789 | Mike | (0.82, 0.05, 0.18, ...) |
| 13478 | outfielder | (0.54, 0.25, 0.35, ...) |
| ... | ... | ... |
| 75356 | Michael | (0.05, 0.78, 0.20, ...) |
| 92467 | Mike | (0.12, 0.70, 0.18, ...) |
| 28479 | Mike | (0.16, 0.62, 0.14, ...) |
| 16357 | drama | (0.21, 0.65, 0.13, ...) |
| 84532 | perform | (0.14, 0.50, 0.24, ...) |
| 25736 | actor | (0.03, 0.50, 0.12, ...) |
| ... | ... | ... |
| 57825 | news | (0.30, 0.28, 0.65, ...) |
| 93753 | suspect | (0.13, 0.18, 0.69, ...) |
| 26578 | crime | (0.06, 0.15, 0.73, ...) |
| ... | ... | ... |

FIG.5

Calculation results of scores

| Expression appearance position ID | Related expression candidate | Assignment degree vectors of related expression candidate | Assignment degree vectors for input expression | Score |
|---|---|---|---|---|
| 15816 | stadium | [0.62, 0.05, 0.12, ...] | [0.34, 0.41, 0.08, ...] | 0.21 |
| 74789 | Mike | [0.82, 0.05, 0.18, ...] | [0.34, 0.41, 0.08, ...] | 0.26 |
| 92467 | Mike | [0.12, 0.70, 0.18, ...] | [0.34, 0.41, 0.08, ...] | 0.34 |
| 28479 | Mike | [0.16, 0.62, 0.14, ...] | [0.34, 0.41, 0.08, ...] | 0.29 |
| 16357 | drama | [0.21, 0.65, 0.13, ...] | [0.34, 0.41, 0.08, ...] | 0.31 |
| 25736 | actor | [0.03, 0.50, 0.12, ...] | [0.34, 0.41, 0.08, ...] | 0.22 |

Search results of related expressions

1. Mike(92467) = 0.34 : [0.12, 0.70, 0.18, ...]
2. drama(16357) = 0.31 : [0.21, 0.65, 0.13, ...]
3. Mike(28479) = 0.29 : [0.16, 0.62, 0.14, ...]
4. Mike(74789) = 0.26 : [0.82, 0.05, 0.18, ...]
5. actor(25736) = 0.21 : [0.03, 0.50, 0.12, ...]

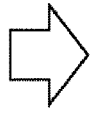

Integrating result of related expressions

1. Mike = 0.89 : [0.30, 0.43, 0.14, ...]
2. drama = 0.31 : [0.06, 0.19, 0.03, ...]
3. actor = 0.21 : [0.01, 0.10, 0.02, ...]

FIG.10

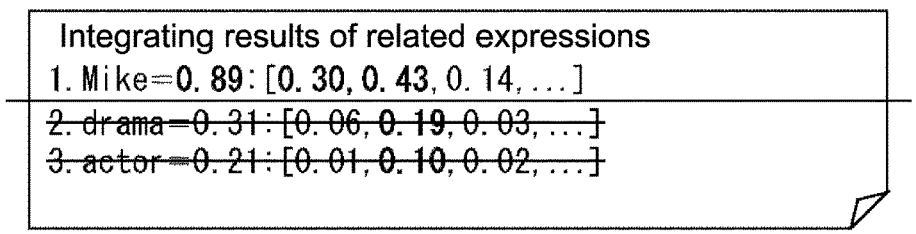
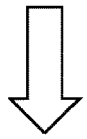
[ Synonym dictionary ]
・Synonym of Michael
  1) Mike (Baseball)
  2) Mike (Actor)
...
FIG.12
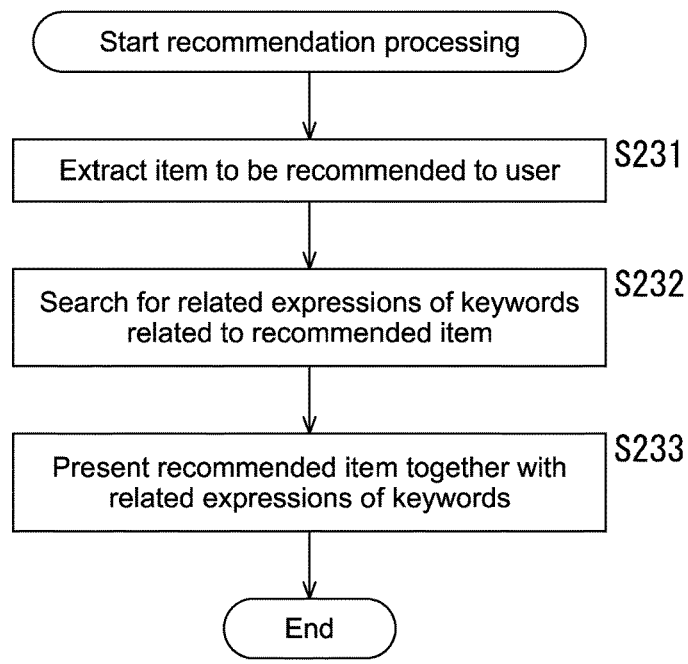
FIG.13

User A: user who likes actor "Michael"

Here is recommended TV program for user A

XXXXXXXX

Keywords in which you may have interest actor    TV

Mike star    perform

User B: user who likes baseball player "Michael"

Here is recommended TV program for user B

YYYYYYYY

Keywords in which you may have interest stadium    victory

Mike hit    homerun

FIG.14

INFORMATION PROCESSING TO SEARCH FOR RELATED EXPRESSIONS

CROSS REFERENCE TO RELATED APPLICATIONS

This application claims the benefit of Japanese Priority Patent Application JP2013-168259 filed Aug. 13, 2013, the entire contents of which are incorporated herein by reference.

BACKGROUND

The present technology relates to an information processing apparatus, an information processing method, and a program and, in particular, to an information processing apparatus, an information processing method, and a program for searching for related expressions.

In related art, there are known technologies for searching for and recommending content suitable for users' preferences based on metadata given to the content (see, for example, Japanese Patent Application Laid-open No. 2007-026425). In such recommendation technologies, related expressions related to expressions included in metadata are searched based on, for example, similarity in feature amount vectors expressing the features of the respective expressions.

SUMMARY

In the related art, however, expressions having the same notation are handled as one expression even if they have a plurality of meanings. Therefore, in a case in which related expressions searched as expressions related to metadata include both a meaning suitable for users' preferences and a meaning not suitable for the users' preferences, it is difficult to handle the related expressions while distinguishing the same from each other.

In view of the above circumstances, it is desirable to improve the convenience of handling the search results of related expressions.

An information processing apparatus according to an embodiment of the present technology includes an expression extraction unit, a feature extraction unit, a clustering unit, a related expression extraction unit, and an output unit. The expression extraction unit is configured to extract a plurality of expressions from a plurality of documents. The feature extraction unit is configured to extract feature amounts of the extracted respective expressions while distinguishing the expressions having the same notation from each other. The clustering unit is configured to cluster the extracted respective expressions together while distinguishing the expressions having the same notation from each other and to calculate assignment degree vectors having assignment degrees of the respective expressions to two or more respective clusters as components. The related expression extraction unit is configured to extract related expressions having the assignment degree vectors similar to the assignment degree vectors of a provided input expression while distinguishing the expressions having the same notation from each other. The output unit is configured to output the related expressions and identification information for identifying the related expressions.

The output unit may further output at least one of the assignment degree vectors of the related expressions and scores expressing similarity in the assignment degree vectors between the related expressions and the input expression.

The information processing apparatus may further include a synonym extraction unit configured to add together the scores of the related expressions having the same notation and to extract the related expression of which the score is higher as a synonym of the input expression.

The synonym extraction unit may weight and add together the assignment degree vectors of the related expressions having the same notation according to the scores and divide, when the assignment degree vectors of the extracted synonym have components of a prescribed threshold or more, the synonym into pieces for each of the clusters corresponding to the components of the prescribed threshold or more.

The information processing apparatus may further include a recommendation unit configured to recommend an item to a user. The related expression extraction unit may extract a related expression of a keyword related to the recommended item, and the recommendation unit may present the related expression of the keyword to the user together with the recommended item.

The recommendation unit may present feature amounts of the related expression of the keyword to the user together with the recommended item.

The information processing apparatus may further include a recommendation unit configured to recommend an item to a user. The related expression extraction unit may extract a related expression of a keyword included in feature amounts of the user or feature amounts of the item, and the recommendation unit may add the related expression of the keyword to the feature amounts of the user or the feature amounts of the item.

The recommendation unit may further add feature amounts of the related expression of the keyword to the feature amounts of the user or the feature amounts of the item.

When a plurality of input expressions are provided, the related expression extraction unit may extract expressions as the related expressions, the expressions having the assignment degree vectors similar to either vectors obtained by adding together the assignment degree vectors for the plurality of input expressions or vectors obtained by multiplying together the assignment degree vectors for the plurality of input expressions for each of the components.

The identification information may express a document from which the related expressions are extracted and a position in the document.

The feature amounts of the expressions may include expressions extracted from vicinities of the expressions in the document from which the expressions are extracted.

An information processing method according to another embodiment of the present technology includes: extracting a plurality of expressions from a plurality of documents; extracting feature amounts of the extracted respective expressions while distinguishing the expressions having the same notation from each other; clustering the extracted respective expressions together while distinguishing the expressions having the same notation from each other and calculating assignment degree vectors having assignment degrees of the respective expressions to two or more respective clusters as components; extracting related expressions having the assignment degree vectors similar to the assignment degree vectors of a provided input expression while distinguishing the expressions having the same notation from each other; and outputting the related expressions and identification information for identifying the related expressions.

A program according to still another embodiment of the present technology causes a computer to execute processing including: extracting a plurality of expressions from a plurality of documents; extracting feature amounts of the extracted respective expressions while distinguishing the expressions having the same notation from each other; clustering the extracted respective expressions together while distinguishing the expressions having the same notation from each other and calculating assignment degree vectors having assignment degrees of the respective expressions to two or more respective clusters as components; extracting related expressions having the assignment degree vectors similar to the assignment degree vectors of a provided input expression while distinguishing the expressions having the same notation from each other; and outputting the related expressions and identification information for identifying the related expressions.

In the embodiment of the present technology, the plurality of expressions are extracted from the plurality of documents, the feature amounts of the extracted respective expressions are extracted while the expressions having the same notation are distinguished from each other, the extracted respective expressions are clustered together while the expressions having the same notation are distinguished from each other, the assignment degree vectors having the assignment degrees of the respective expressions to the two or more respective clusters as the components are calculated, the related expressions having the assignment degree vectors similar to the assignment degree vectors of the provided input expression are extracted while the expressions having the same notation are distinguished from each other, and the related expressions and the identification information for identifying the related expressions are output.

According to the embodiment of the present technology, it is possible to search for related expressions while distinguishing the expressions having the same notation from each other. As a result, the convenience of handling the search results of related expressions is improved.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a diagram showing a configuration example of a clustering result DB;

FIG. 10 is a diagram showing an example of integrating related expressions having the same notation;

FIG. 12 is a diagram for describing a specific example of the synonym extraction processing;

FIG. 13 is a flowchart for describing recommendation processing;

FIG. 14 is a diagram for describing a specific example of the recommendation processing;

DETAILED DESCRIPTION OF EMBODIMENTS

Hereinafter, a embodiment for carrying out the present technology (hereinafter referred to as embodiment) will be described. Note that a description thereof will be given in the following order:
1. Embodiment
2. Modified Example 1. Embodiment Configuration Example of Information Processing Apparatus 11

Figure 1:
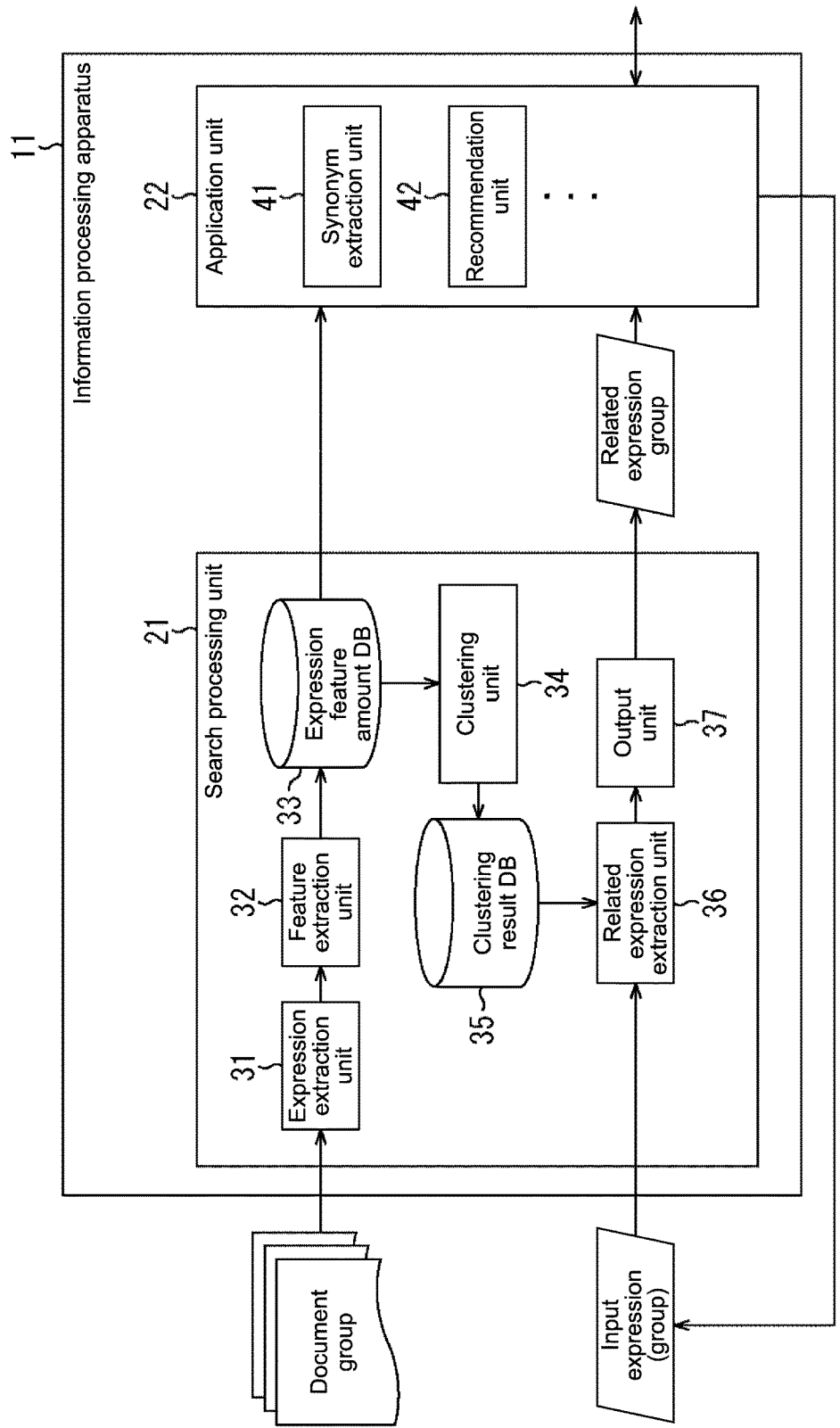
FIG. 1 is a block diagram showing an embodiment of an information processing apparatus to which the present technology is applied.

FIG. 1 is a block diagram showing an embodiment of an information processing apparatus 11 to which the present technology is applied.

The information processing apparatus 11 clusters together a plurality of expressions extracted from a document group including a plurality of documents to be retained. In addition, the information processing apparatus 11 searches for related expressions related to given input expressions from the retained expressions. Moreover, the information processing apparatus 11 performs various processing using the search results of related expressions.

Note that expressions to be processed by the information processing apparatus 11 are those composed of characters, symbols, or the like and each expression includes not only a single word but also a phrase combining a plurality of words together, or the like.

The information processing apparatus 11 includes a search processing unit 21 and an application unit 22.

The search processing unit 21 clusters together expressions extracted from a document group to be retained, searches for related expressions related to input expressions from the retained expressions, and outputs the search results to the application unit 22.

The search processing unit 21 includes an expression extraction unit 31, a feature extraction unit 32, an expression feature amount database (DB) 33, a clustering unit 34, a clustering result database (DB) 35, a related expression extraction unit 36, and an output unit 37.

The expression extraction unit 31 extracts expressions included in a document group and supplies the extraction results of the expressions and the document group as an extraction source to the feature extraction unit 32. Note that, although documents from which expressions are extracted by the expression extraction unit 31 are not particularly limited, the documents include, for example, various documents opened to the public at Internet sites or the like in their accessible state.

The feature extraction unit 32 calculates the feature amounts of respective expressions extracted by the expression extraction unit 31 and stores the respective expressions and the feature amounts in the expression feature amount DB 33.

The clustering unit 34 clusters together respective expressions stored in the expression feature amount DB 33. Then, the clustering unit 34 calculates assignment degree vectors composed of the assignment degrees of the respective expressions to two or more prescribed clusters and stores the same in the clustering result DB 35.

The related expression extraction unit 36 extracts related expressions related to an input expression or an input expression group including a plurality of input expressions using the clustering result DB 35 and supplies the same to the output unit 37.

The output unit 37 outputs the search results of extracted related expressions including a related expression group to the application unit 22.

Note that as will be described later, the respective units of the search processing unit 21 handles expressions having the same notation as different expressions while distinguishing the same from each other.

As will be described later, the application unit 22 performs various processing using the search results of related expressions and the expression feature amount DB 33. The application unit 22 includes a synonym extraction unit 41 and a recommendation unit 42.

The synonym extraction unit 41 extracts the synonyms of certain expressions based on the search results of related expressions and registers the same in a synonym dictionary.

The recommendation unit 42 recommends items to clients operated by users via networks such as the Internet (not shown). In addition, using the results of related expressions searched by the search processing unit 21, the recommendation unit 42 presents related keywords together with recommended items or expands the feature amounts of items and users.

Note that items recommended by the recommendation unit 42 are not limited to specific types of items. For example, various types of content and commercial products such as moving images, still images, books, documents, songs, TV programs, software, news articles, blog articles, microblog sentences, and information, users in community sites, and communities in community sites are assumed.

(Processing of Information Processing Apparatus 11)

Next, the processing of the information processing apparatus 11 will be described. Note that the description will be given, for easy understanding, of a case in which each of expressions handled by the information processing apparatus 11 is basically composed of a single word.

(Expression Data Collection Processing)

Figure 2:
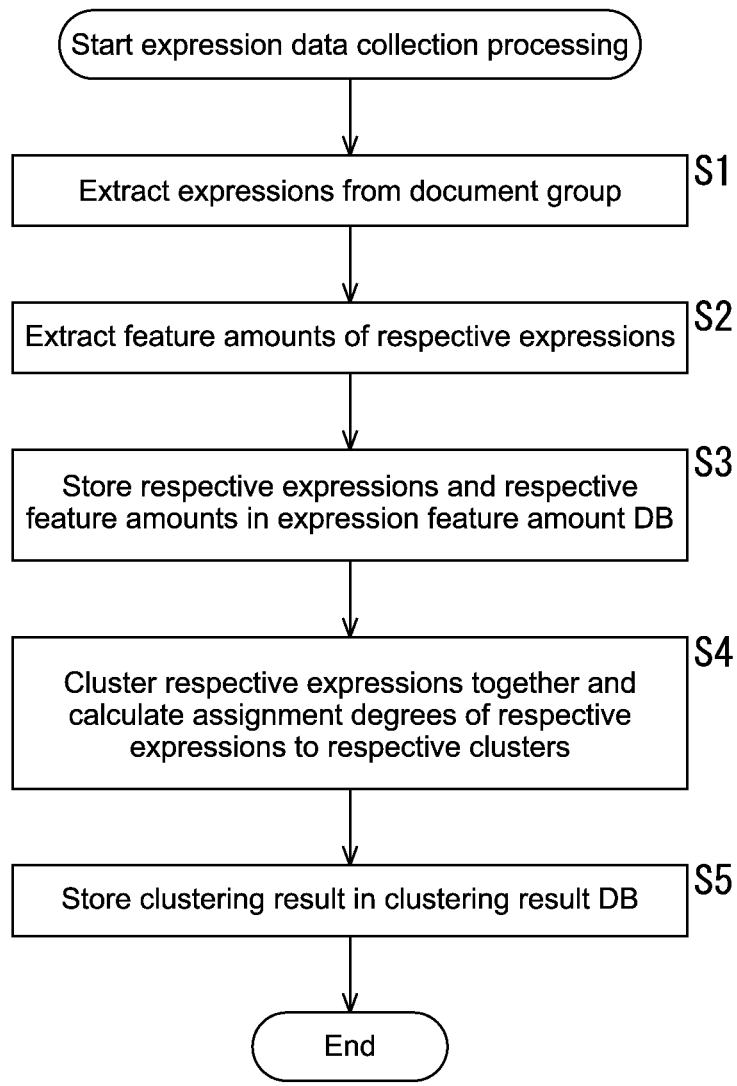
FIG. 2 is a flowchart for describing expression data collection processing.

First, expression data collection processing executed by the information processing apparatus 11 will be described with reference to the flowchart of FIG. 2. Note that the processing is executed, for example, periodically off-line.

Figures 3, 4:
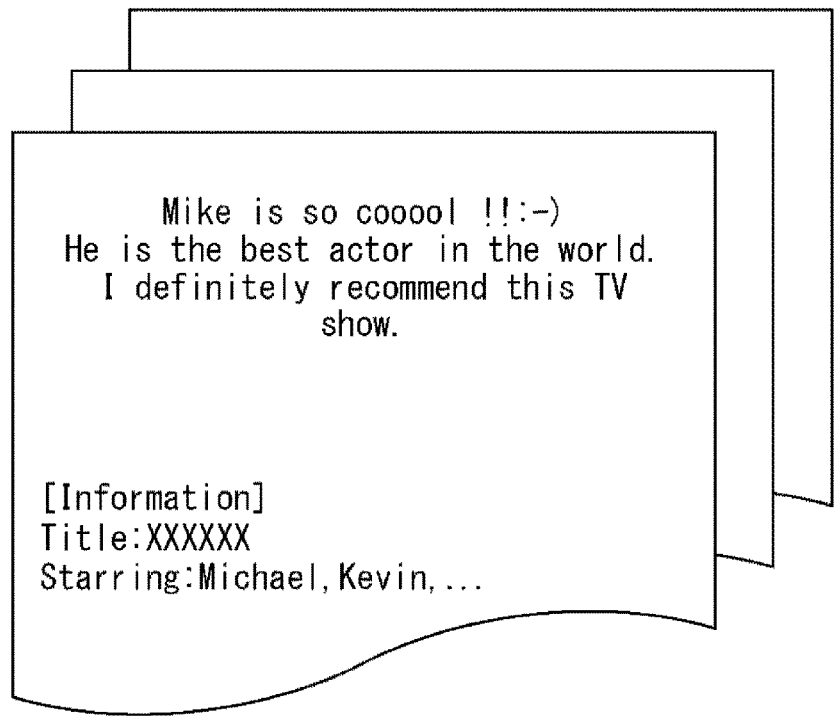
FIG. 3 is a diagram showing an example of documents.
FIG. 4 is a diagram showing a configuration example of an expression feature amount DB.

In Step S1, the expression extraction unit 31 extracts expressions from a document group. Specifically, the expression extraction unit 31 acquires a plurality of documents from various places. FIG. 3 shows an example of documents acquired by the expression extraction unit 31.

The expression extraction unit 31 extracts expressions from the acquired document group using a prescribed method. Note that any method such as a morpheme analysis is available for extracting expressions.

In addition, the expression extraction unit 31 narrows down the extracted expressions according to a prescribed rule. For example, the expression extraction unit 31 removes, from the extracted expressions, the expressions of the specific units of speech and expressions such as stop words excluded from search targets. The expression extraction unit 31 supplies the extraction results of the expressions and the document group to the feature extraction unit 32.

In Step S2, the feature extraction unit 32 extracts the feature amounts of the respective expressions (hereinafter referred to as expression feature amounts). For example, in the documents from which expressions as the extraction targets of the feature amounts (hereinafter referred to as extraction target expressions) have been extracted, the feature extraction unit 32 extracts expressions near the extraction target expressions as the expression feature amounts. More specifically, for example, among the expressions extracted from the documents from which the extraction target expressions have been extracted, 2n expressions in the range of n (for example, n=10) before and after the extraction target expressions are extracted as the expression feature amounts of the extraction target expressions. Alternatively, for example, all expressions extracted from the same documents as the extraction target expressions may be handled as the expression feature amounts of the extraction target expressions.

Besides, it is possible to use, as the expression feature amounts, any other feature amounts expressing the features of the respective expressions, the features of the documents as extraction sources, the features of the contexts of the units from which the respective expressions have been extracted, or the like. For example, it is possible to use, as the expression feature amounts, the writers, the types, and the titles of the documents, the sites of the documents, (the user IDs of) users having viewed the documents, or the like. Note that the following description will be given of a case in which expressions near the above respective expressions are extracted as the expression feature amounts.

In Step S3, the feature extraction unit 32 stores the respective expressions and the feature amounts (expression feature amounts) in the expression feature amount DB 33.

FIG. 4 shows a configuration example of the expression feature amount DB 33. The expression feature amount DB 33 includes the three items (fields) of expression appearance position IDs, expressions, and expression feature amounts.

In the field of the expression appearance position IDs, the expression appearance position IDs as identification information items for identifying the respective expressions based on their appearance positions are registered. That is, with the expression appearance position IDs, it becomes possible to recognize documents in which the respective expressions appear and positions in the documents. In addition, with the expression appearance position IDs, it becomes possible to handle the expressions having the same notation as different expressions while distinguishing the same from each other.

In the field of the expressions, specific contents on the respective expressions are registered.

In the field of the expression feature amounts, specific contents on the expression feature amounts of the respective expressions are registered.

In the example of FIG. 4, "drama," "actor," "TV," etc., are registered as the expression feature amounts of the expression "Michael" of the expression appearance position ID "12454," and "star," "perform," "character," etc., are registered as the expression feature amounts of the expression "Mike" of the expression appearance position ID "15635." In addition, expressions (for example, "Michael" and "Mike") having the same notation are distinguished from each other and registered as different expressions.

In Step S4, the clustering unit 34 clusters the respective expressions together and calculates the assignment degrees of the respective expressions to respective clusters. Specifically, using a soft clustering method such as a Fuzzy c-means method and a PLSA (Probabilistic Latent Semantic Analysis) method, the clustering unit 34 calculates the assignment degrees of the respective expressions to prescribed two or more clusters based on the expression feature amounts of the respective expressions. Note that the number or type of the clusters is set in advance according to an experiment or the like.

Then, the clustering unit 34 calculates assignment degree vectors in which the assignment degrees of the respective expressions to the respective clusters are vectorized. That is, the assignment degree vectors are vectors having the assignment degrees of the respective expressions to the respective clusters as components. In addition, for example, the respective assignment degree vectors are normalized such that values obtained by adding together the values of the respective components becomes 1.

In Step S5, the clustering unit 34 stores the clustering result in the clustering result DB 35. That is, the clustering unit 34 stores the assignment degree vectors of the respective expressions in the clustering result DB 35.

FIG. 5 shows a configuration example of the clustering result DB 35. The clustering result DB 35 includes the three items (fields) of expression appearance position IDs, expressions, and expression feature amounts.

In the field of the expression appearance position IDs, the expression appearance position IDs are registered as in the expression feature amount DB 33 of FIG. 4.

In the field of the expressions, specific contents on the respective expressions are registered as in the expression feature amount DB 33 of FIG. 4.

In the field of the expression feature amounts, the assignment degree vectors of the respective expressions are registered. Note that in this example, components having the greatest values among the components of the respective assignment degree vectors are indicated in bold type.

In the example of FIG. 5, (0.62, 0.05, 0.12, etc.,) are registered as the assignment degree vectors of the expression "stadium" of the expression appearance position ID "15816," and (0.74, 0.02, 0.17, etc.,) are registered as the assignment degree vectors of the expression "Michael" of the expression appearance position ID "73525." In addition, expressions (for example, "Michael") having the same notation are distinguished from each other and registered as different expressions. After that, the expression data collection processing is ended.

First Embodiment of Related Expression Search Processing

Next, a first embodiment of related expression search processing executed by the information processing apparatus 11 will be described with reference to the flowchart of FIG. 6. Note that the processing is started, for example, when an input expression for which related expressions are searched is provided to the related expression extraction unit 36.

In Step S101, the related expression extraction unit 36 calculates assignment degree vectors for an input expression. Specifically, the related expression extraction unit 36 extracts, from the clustering result DB 35, a record in which an expression having the same notation as the input expression is registered. The related expression extraction unit 36 calculates the assignment degree vectors for the input expression by adding together the assignment degree vectors included in the extracted record and normalizing the added vectors so as to have a size of 1. That is, the calculated assignment degree vectors are vectors obtained by averaging the assignment degree vectors of the expression having the same notation as the input expression.

In Step S102, the related expression extraction unit 36 performs prescribed filtering using the input expression to extract related expression candidates. Specifically, for example, the related expression extraction unit 36 extracts, as the related expression candidates, expressions extracted from the same document as the expression having the same notation as the input expression. Alternatively, for example, the related expression extraction unit 36 extracts, as the related expression candidates, expressions including expressions having the same notation as the input expression in the expression feature amounts thereof from the expression feature amount DB 33. Then, the related expression extraction unit 36 extracts records, in which the extracted related expression candidates are recorded, from the clustering result DB 35.

In Step S103, the related expression extraction unit 36 calculates the scores of the respective related expression candidates based on similarity with the input expression. For example, the related expression extraction unit 36 calculates the inner product of the assignment degree vectors of the respective related expression candidates and the assignment degree vectors for the input expression as the similarity between the respective related expression candidates and the input expression and sets the same as the scores of the respective related expression candidates.

Figure 7:
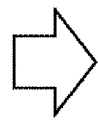
FIG. 7 is a diagram showing an example of search results of related expressions.

The upper area of FIG. 7 shows an example in which the scores of respective related expression candidates are calculated by the inner product of assignment degree vectors when an input expression is "Michael." For example, the score of the related expression candidate "stadium" of the expression appearance position ID "15816" is 0.21, and the score of the related expression candidate "Mike" of the expression appearance portion ID "74789" is 0.26.

In Step S104, the related expression extraction unit 36 extracts related expressions based on the calculated scores. For example, the related expression extraction unit 36 extracts expressions each having a score of a prescribed threshold or more as the related expressions from the related expression candidates. Alternatively, for example, the related expression extraction unit 36 extracts a prescribed number of expressions in descending order of the scores as the related expressions from the related expression candidates. Then, the related expression extraction unit 36 supplies the extraction results of the related expressions to the output unit 37. The extraction results include, for example, the input expression, the related expressions, the expression appearance position IDs of the related expressions, the assignment degree vectors, and the scores.

For example, the lower area of FIG. 7 shows an example of the related expressions extracted based on the calculation results of the above scores. Specifically, the expression "Mike" of the expression appearance position ID "92467," the expression "drama" of the expression appearance position ID "16357," the expression "Mike" of the expression appearance position ID "28479," the expression "Mike" of the expression appearance position ID "74789," and the expression "actor" of the expression appearance position ID "25736" are extracted as the related expressions. In addition, the scores and the assignment degree vectors of the respective related expressions are included in the search results.

In Step S105, the output unit 37 outputs the related expressions. That is, the output unit 37 outputs the input expression and the expression appearance position IDs, the assignment degree vectors, and the scores of the respective related expressions to the application unit 22 together with the related expressions extracted by the related expression extraction unit 36. After that, the related expression search processing is ended.

In the manner described above, related expressions related to an input expression may be searched. In addition, related expressions having the same notation may be searched as different expressions while being distinguished from each other. This results in an improvement in the convenience of using search results in a subsequent system (for example, the application unit 22) that uses the search results of related expressions. For example, it becomes possible to handle related expressions having the same notation as different expressions or the same expressions. In addition, for example, it becomes possible to handle respective related expressions while distinguishing which contexts the respective related expressions are used using assignment degree vectors and expression feature amounts. As a result, variations in the processing of the subsequent system may be increased, and the accuracy of the processing may be improved.

Second Embodiment of Related Expression Search Processing

Next, a second embodiment of the related expression search processing executed by the information processing apparatus 11 will be described with reference to the flowchart of FIG. 8. The second embodiment is so configured as to be capable of extracting the related expressions of an input expression group including a plurality of expressions.

Note that the processing is started, for example, when an input expression group is provided to the related expression extraction unit 36.

In Step S131, the related expression extraction unit 36 calculates assignment degree vectors for respective input expressions. That is, the related expression extraction unit 36 calculates the assignment degree vectors for the respective input expressions included in the input expression group by the same processing as Step S101 of FIG. 6.

In Step S132, the related expression extraction unit 36 calculates assignment degree vectors for the input expression group. For example, the related expression extraction unit 36 calculates the assignment degree vectors for the input expression group (i.e., all the input expressions) by adding together the assignment degree vectors for the respective input expressions calculated in the processing of Step S131 and then normalizing the same. The assignment degree vectors are vectors particularly expressing the features of any of the expressions of the input expression group.

Alternatively, for example, the related expression extraction unit 36 calculates the assignment degree vectors for the input expression group (i.e., all the input expressions) by multiplying together the assignment degree vectors for the respective input expressions calculated in the processing of Step S131 for each corresponding component and then normalizing the same. The assignment degree vectors are vectors particularly expressing features common to all the expressions of the input expression group.

In Step S133, the related expression extraction unit 36 performs prescribed filtering using the input expression group to extract related expression candidates. Specifically, for example, the related expression extraction unit 36 extracts, as the related expression candidates, expressions extracted from the same document as the expression having the same notation as any of the expressions of the input expression group. Alternatively, for example, the related expression extraction unit 36 extracts, as the related expression candidates, expressions including expressions having the same notation as any of the expressions of the input expression group in the expression feature amounts thereof. Then, the related expression extraction unit 36 extracts records, in which the extracted related expression candidates are registered, from the clustering result DB 35.

In Step S134, the related expression extraction unit 36 calculates the scores of the respective related expression candidates based on similarity with the input expression group. For example, the related expression extraction unit 36 calculates the inner product of the assignment degree vectors of the respective related expression candidates and assignment degree vectors for the input expression group as the similarity between the respective related expression candidates and the input expression group and sets the same as the scores of the respective related expression candidates.

Figure 6:
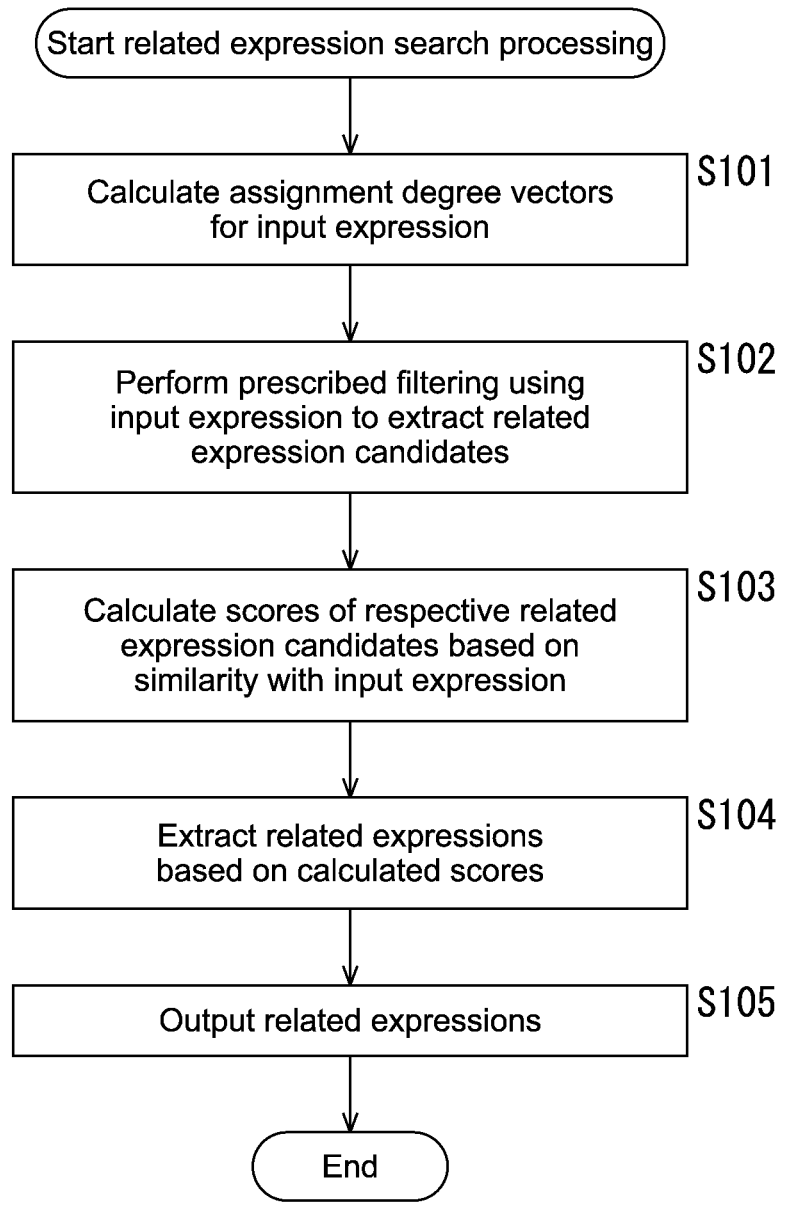
FIG. 6 is a flowchart for describing a first embodiment of related expression search processing.

In Steps S135 and S136, the same processing as Steps S104 and S105 of FIG. 6 is executed. After that, the related expression search processing is ended.

In the manner described above, related expressions related to a plurality of input expressions may be searched. In addition, related expressions having the same notation may be searched as different expressions while being distinguished from each other.

Third Embodiment of Related Expression Search Processing

Next, a third embodiment of the related expression search processing executed by the information processing apparatus 11 will be described with reference to the flowchart of FIG. 9. The third embodiment is so configured as to be capable of outputting related expressions having the same notation in their integrated state.

Note that the processing is started, for example, when an input expression is provided to the related expression extraction unit 36.

In Steps S161 to S164, the same processing as Steps S101 to S104 of FIG. 6 is executed. Thus, the related expressions of the input expression are extracted.

In Step S165, the output unit 37 integrates the related expressions having the same notation. Specifically, by adding together the scores of the related expressions having the same notation among the extracted related expressions, the output unit 37 calculates the score (hereinafter referred to as the combined score) of all the related expressions having the notation.

In addition, by weighting and adding together the respective components of the assignment degree vectors of the related expressions having the same notation among the extracted related expressions, the output unit 37 generates the assignment degree vectors (hereinafter referred to as the combined assignment degree vectors) of all the related expressions having the notation.

FIG. 10 shows an example of the integrating result of related expressions having the same notation. In FIG. 10, the calculation results of the scores and the search results of the related expressions of FIG. 10 are the same as those of FIG. 7, and the search results of the related expressions include three expressions having the same notation (i.e., "Mike").

Accordingly, the three expressions of "Mike" are integrated into one expression. That is, the value (0.34+0.29+

0.26=0.89) obtained by adding together the scores of the three expressions of "Mike" is calculated as the combined score of all the expressions of "Mike." In addition, by weighting and adding together the respective components of the assignment degree vectors of the three expressions of "Mike" according to the scores, combined assignment degree vectors for all the expressions of "Mike" are generated. For example, the value of a first component of the combined assignment degree vectors for all the expressions of "Mike" is 0.30 (=0.34×0.12+0.29×0.16+0.26×0.82). Thus, as shown in the lower right area of FIG. 10, the search results of the related expressions in which the three expressions of "Mike" are integrated into the one expression may be obtained.

In Step S166, the output unit 37 outputs the related expressions. That is, together with the related expressions into which the expressions having the same notation are integrated, the output unit 37 outputs the input expression and the expression appearance position IDs, the assignment degree vectors (or the combined assignment degree vectors), and the scores (or the combined score) of the respective related expressions to the application unit 22. After that, the related expression search processing is ended.

In the manner described above, it is also possible to output related expressions having the same notation in their integrated state without distinguishing the same from each other.

Figure 8:
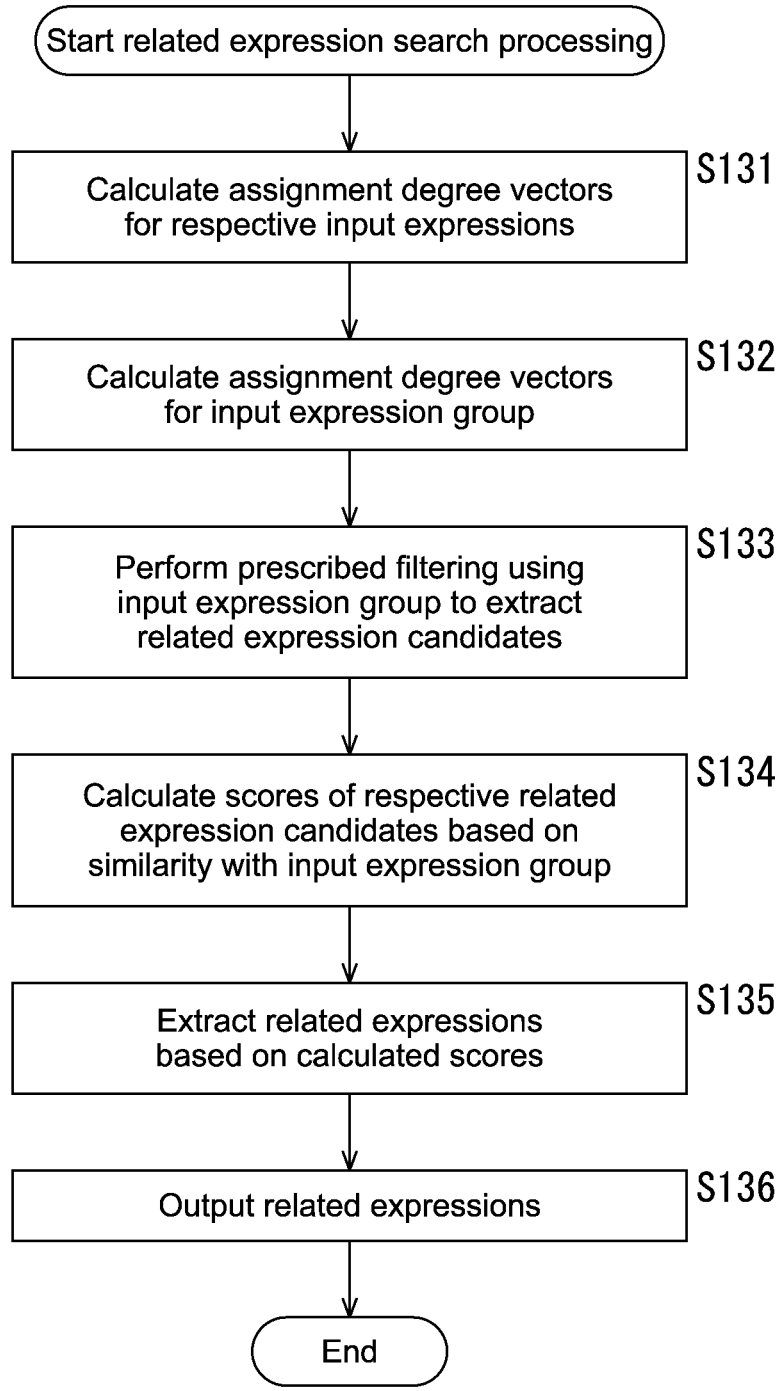
FIG. 8 is a flowchart for describing a second embodiment of the related expression search processing.

Note that even in the related expression search processing of FIG. 8, it is also possible to output related expressions having the same notation in their integrated state.

Next, processing using the search results of related expressions will be described.

(Synonym Extraction Processing)

Figure 11:
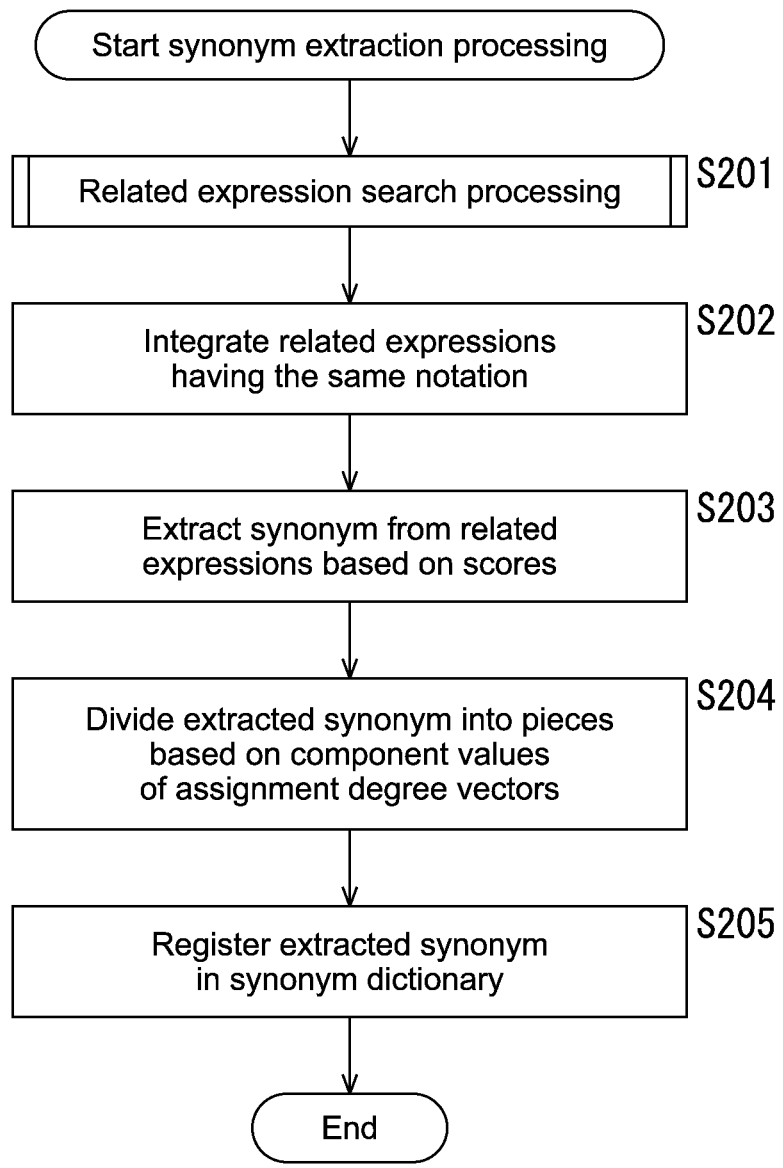
FIG. 11 is a flowchart for describing synonym extraction processing.

First, synonym extraction processing executed by the information processing apparatus 11 will be described with reference to the flowchart of FIG. 11.

Note that the processing is started, for example, when an input expression for which a synonym is searched is provided to the related expression extraction unit 36. In addition, in the processing, a synonym is a concept including a related term and includes not only a single word but also a phase combining a plurality of words together.

In Step S201, the related expression search processing described above with reference to FIG. 6 or 8 is executed to search for the related expressions of an input expression. Then, the search results of the related expressions of the input expression are supplied from the output unit 37 to the synonym extraction unit 41 of the application unit 22.

Figure 9:
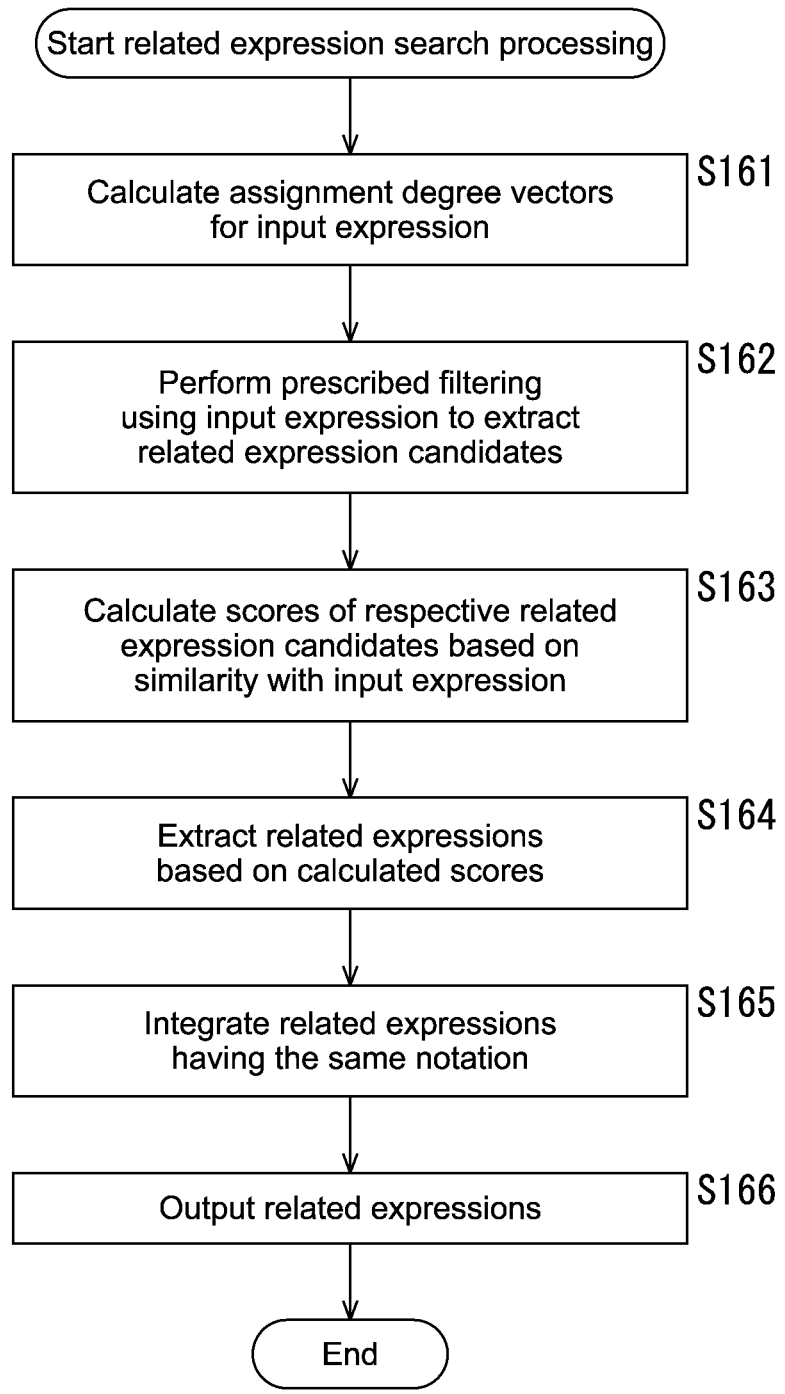
FIG. 9 is a flowchart for describing a third embodiment of the related expression search processing.

In Step S202, the synonym extraction unit 41 integrates related expressions having the same notation by the same processing as Step S165 of FIG. 9. Thus, the combined score and the combined assignment degree vectors of all the related expressions having the same notation are calculated. Then, in the following processing, a synonym is extracted in a state in which the related expressions having the same notation are integrated into one expression.

Note that when the related expressions having the same notation have been integrated by the related expression search processing of FIG. 9 in Step S201, the processing of Step S202 may be omitted.

In Step S203, the synonym extraction unit 41 extracts a synonym from the related expressions based on the scores. Specifically, for example, the synonym extraction unit 41 extracts, as the synonym of the input expression, a related expression having a score (or a combined score as for a related expression in which expressions having the same notation are integrated) of a prescribed value or more.

For example, FIG. 12 shows an example of a case in which the synonym of the input expression "Michael" is extracted. Note that the integrating result of related expressions in the upper area of FIG. 12 are the same as those of the example of FIG. 10. In this example, the expression "Mike" having a score or a combined score of a prescribed value or more is extracted as the synonym of the input expression "Michael."

In Step S204, the synonym extraction unit 41 divides the extracted synonym into pieces based on the component values of the assignment degree vectors. Specifically, for the extracted synonym, the synonym extraction unit 41 determines whether the corresponding assignment degree vectors (the combined assignment degree vectors as for the synonym in which the expressions having the same notation are integrated) have a plurality of components of a prescribed threshold or more. Then, as for the synonym having the assignment degree vectors or the combined assignment degree vectors having the plurality of components of the prescribed threshold or more, the synonym extraction unit 41 divides it into pieces for each of clusters corresponding to the respective components of the threshold or more. That is, the synonym extraction unit 41 distinguishes the synonyms having a high likelihood of belonging to the plurality of clusters of the extracted synonym as the synonyms different for each of the clusters.

For example, in the example of FIG. 12, two components show higher values (0.30 and 0.43) in the combined assignment degree vectors of the expression "Mike" extracted as the synonym of the input expression "Michael." For example, when clusters corresponding to the two components indicate baseball and a movie, the synonym "Michael" may be divided into the two synonyms of a baseball player "Mike" and an actor "Mike."

In Step S205, the synonym extraction unit 41 registers the extracted synonym in a synonym dictionary (not shown). That is, the synonym extraction unit 41 registers the extracted synonym in the synonym dictionary as the synonym of the input expression. On this occasion, the synonyms having the same notation, which are divided in the processing of Step S204, are registered as different synonyms. After that, the synonym extraction processing is ended.

In the manner described above, the synonym of an input expression may be extracted and registered in a synonym dictionary. In addition, synonyms having the same notation and belonging to different categories (for example, synonyms different from each other in meaning) may be extracted as different synonyms.

(Recommendation Processing)

Next, recommendation processing executed by the information processing apparatus 11 will be described with reference to the flowchart of FIG. 13.

Note that the processing is started, for example, when a command for recommending an item is input to the recommendation unit 42 of the application unit 22.

In Step S231, the recommendation unit 42 extracts an item to be recommended to a user. Note that any method is available as the method of extracting the recommended item.

In Step S232, the information processing apparatus 11 searches for the related expressions of keywords related to the recommended item. Specifically, the recommendation unit 42 provides the keywords used for extracting the recommended item to the related expression extraction unit 36 as input expressions.

The keywords are, for example, keywords explicitly provided by the user as conditions for extracting the recommended item. Alternatively, the keywords are, for example, keywords extracted as those expressing user's preferences in the extraction processing of the recommended item. Note that the number of the keywords may be one or two or more. In addition, each of the keywords may include a single word or a phrase combining a plurality of words together.

Then, when the number of the provided keywords is one, the related expression search processing described above with reference to FIG. 6 is executed. On the other hand, when the number of the provided keywords is two or more, the related expression search processing described above with reference to FIG. 8 is executed. Thus, the related expressions of the provided keywords are searched, and the search results are supplied from the output unit 37 to the recommendation unit 42 of the application unit 22.

In Step S233, the recommendation unit 42 presents the recommended item together with the related expressions of the keywords. For example, the recommendation unit 42 reads the expression feature amounts of the related expressions of the searched keywords (i.e., expressions near the related expressions in a document as the extraction source of the related expressions) from the expression feature amount DB 33. Then, the recommendation unit 42 extracts an expression close to the user's preferences from the searched related expressions based on the read expression feature amounts. In addition, the recommendation unit 42 transmits information including the recommended item, the keywords, the extracted related expressions, and the expression feature amounts of the related expressions to, for example, a client (not shown) operated by the user.

For example, as shown in FIG. 14, extracted related expressions and their expression feature amounts are presented to clients operated by users together with recommended items. Note that the left area of FIG. 14 shows an example of a presentation screen in which a TV program is recommended to a user A who likes an actor Michael and the right area of FIG. 14 shows an example of a presentation screen in which a TV program is recommended to a user B who likes a baseball player Michael.

That is, the TV program related to the actor Michael is recommended to the user A. In addition, the related expression "Mike" of the actor Michael and its expression feature amounts are presented as keywords in which the user A may have an interest and as recommendation reasons.

On the other hand, a TV program related to the baseball player Michael is recommended to the user B. In addition, the related expression "Mike" of the baseball player Michael and its expression feature amounts are presented as keywords in which the user B may have an interest and as recommendation reasons.

As described above, since the information processing apparatus 11 is allowed to handle the related expressions having the same notation while distinguishing the same from each other, it becomes possible to present not only the related expressions "Mike" having the same notation but also the other keywords expressing the meaning of "Mike," contexts, or the like according to the preferences of the respective users.

Note that only a plurality of related expressions of keywords may be presented without the expression feature amounts of the related expressions of the keywords. That is, in the example of FIG. 14, a plurality of related expressions of the keywords "Michael" may be presented. In this case also, since the keywords having the same notation may be handled while being distinguished from each other, it becomes possible to preset the different related expressions of the keywords having the same notation according to the preferences of the users.

Figure 15:
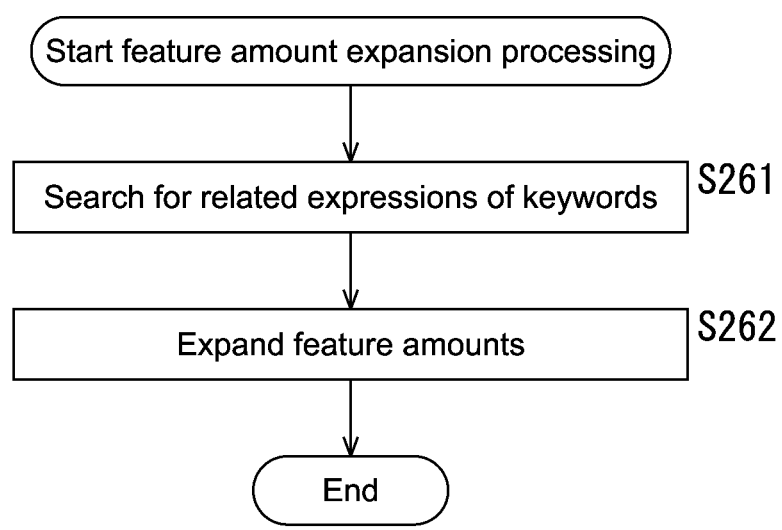
FIG. 15 is a flowchart for describing feature amount expansion processing.

(Feature Amount Expansion Processing) Next, feature amount expansion processing executed by the information processing apparatus 11 will be described with reference to the flowchart of FIG. 15.

Figure 16:
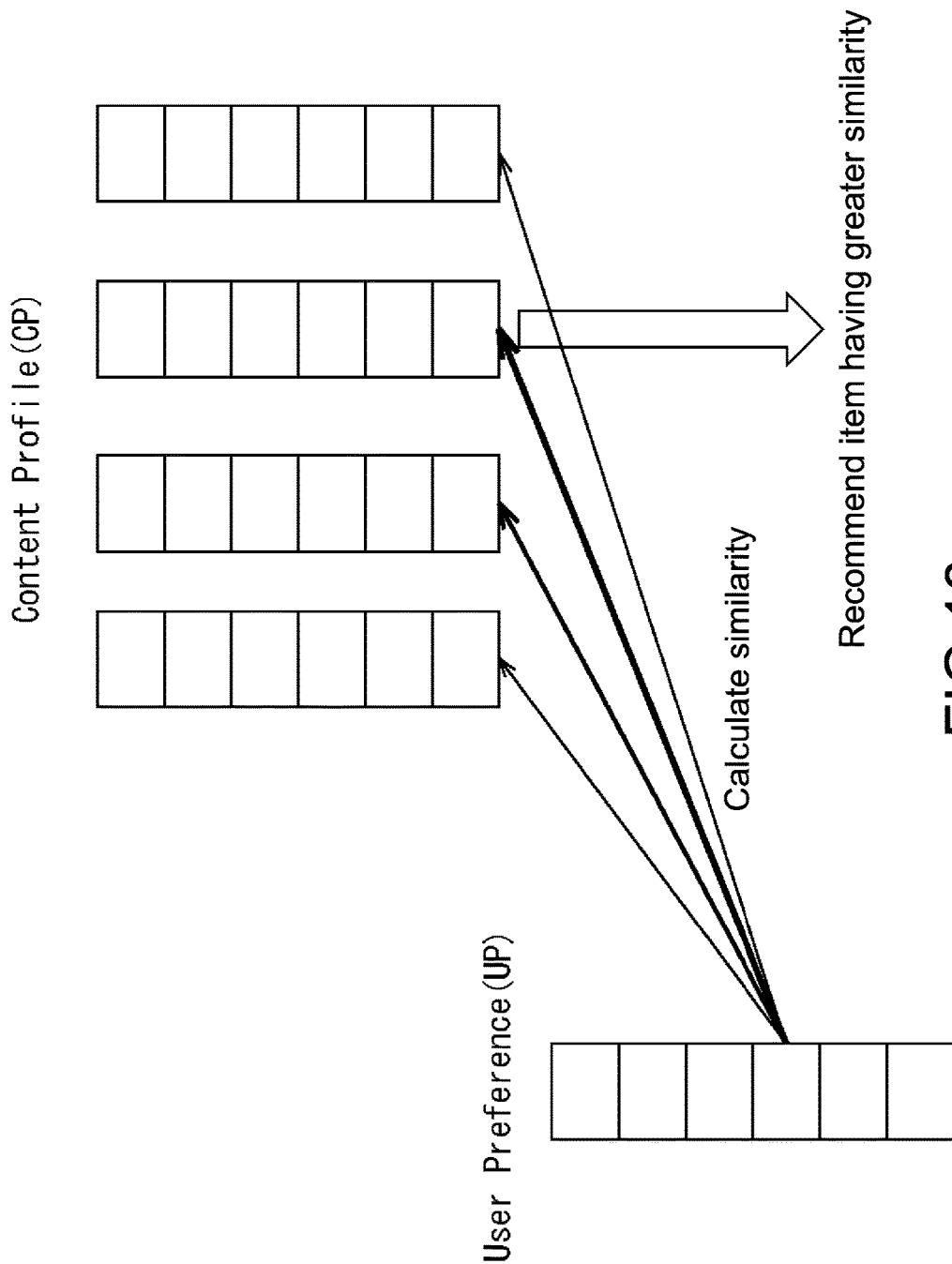
FIG. 16 is a diagram for describing an example of the recommendation processing.

When an item is recommended to a user, the similarity between UP (User Preference) expressing the preferences of the user and CP (Content Profile) expressing the features of respective items is calculated and one of the items having greater similarity is recommended as shown in FIG. 16 for example. Here, the respective squares of the UP and the CP of FIG. 16 indicate feature amounts, and the respective feature amounts are constituted of keywords or the like. The processing is aimed at expanding the keywords constituting the feature amounts of the CP or the UP using related expressions.

In Step S261, the information processing apparatus 11 searches for the related expressions of keywords. Specifically, the recommendation unit 42 selects one of the feature amounts of the UP or the CP to be expanded. In addition, the recommendation unit 42 selects one or a plurality of keywords included in the selected feature amount of the UP or the CP, and provides the selected keywords to the related expression extraction unit 36 as input expressions.

When the number of the provided keywords is one, the related expression search processing described above with reference to FIG. 6 is executed. On the other hand, when the number of the provided keywords is two or more, the related expression search processing described above with reference to FIG. 8 is executed. Thus, the related expressions of the provided keywords are searched, and the search results are supplied from the output unit 37 to the recommendation unit 42 of the application unit 22.

In Step S262, the recommendation unit 42 expands the feature amounts. For example, the recommendation unit 42 reads the expression feature amounts of the related expressions of the searched keywords (i.e., expressions near the related expressions in a document as the extraction source of the related expressions) from the expression feature amount DB 33.

Next, when expanding the UP, the recommendation unit 42 extracts an expression close to user's preferences from the searched related expressions based on the read expression feature amounts. On the other hand, when expanding the CP, the recommendation unit 42 extracts an expression close to the features of the item from the searched related expressions based on the read expression feature amounts.

Then, the recommendation unit 42 adds the extracted related expression and its expression feature amounts to the UP or the CP.

Figure 17:
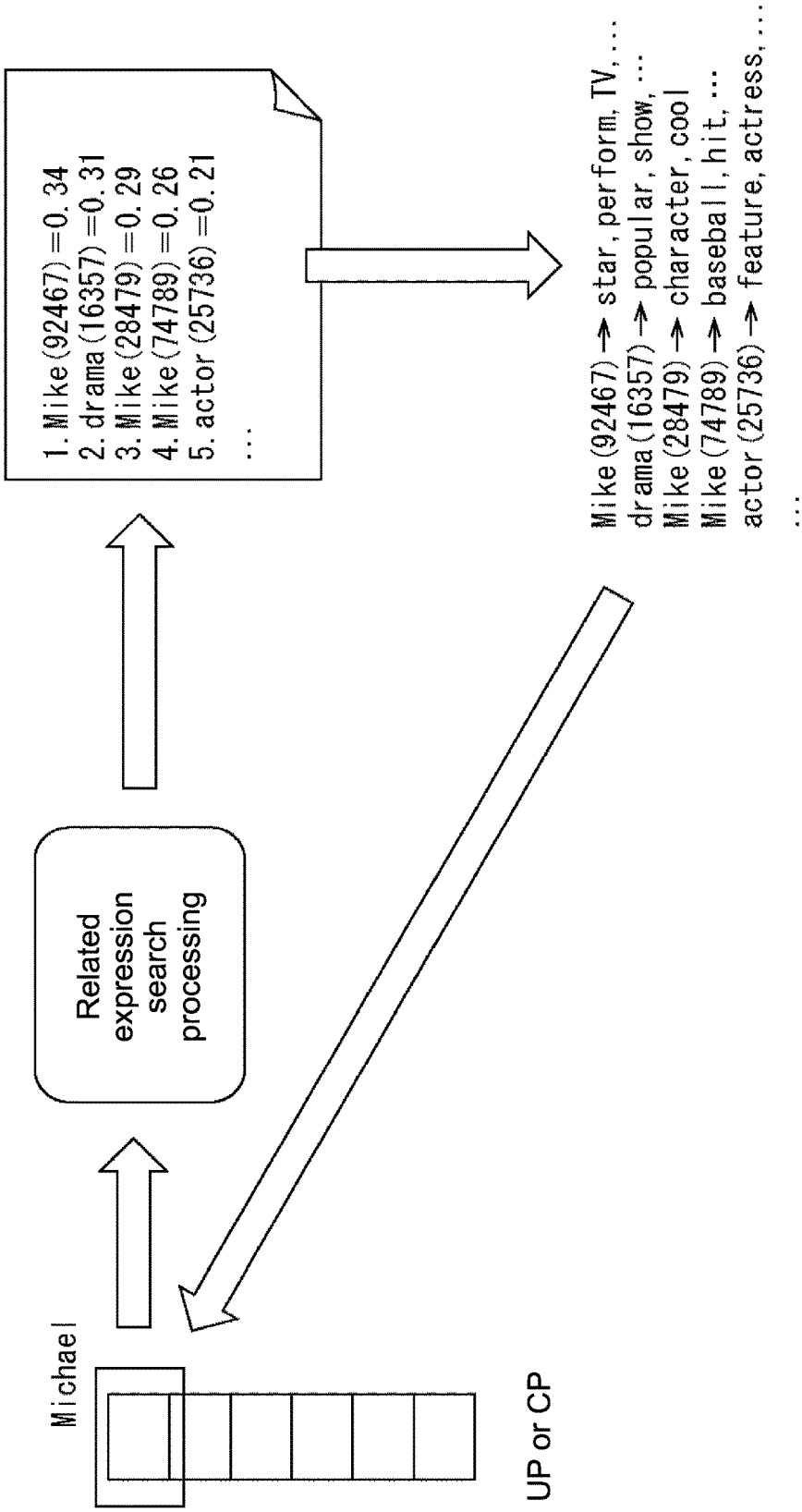
FIG. 17 is a diagram for describing a specific example of the feature amount expansion processing.

In the example of FIG. 17, the related expressions of the keyword "Michael" included in the feature amounts of the UP or the CP are first searched. Next, the expression feature amounts of the searched related expressions are read. Then, a related expression to be added to the UP or the CP is extracted from the searched related expressions based on the expression feature amounts. Subsequently, the extracted related expression and its expression feature amounts are added to the UP or the CP, whereby the UP or the CP is expanded. After that, the processing is executed on all the feature amounts of the UP or the CP to be expanded, whereby the UP or the CP is expanded.

For example, in the related technologies, only the same related expressions may be added to the UP or the CP for the same keywords. On the other hand, the information processing apparatus 11 may distinguish related expressions having the same notation from each other, select an appropriate related expression from the related expressions having the same notation, and add the related expression and its expression feature amounts to the UP or the CP. Accordingly, the information processing apparatus 11 may expand the UP or the CP more effectively and widely. As a result, the information processing apparatus 11 may improve accuracy for recommending items.

Note that it may also be possible to add only a plurality of related expressions to the UP or the CP without adding the expression feature amounts of the related expressions. In this case also, since keywords having the same notation may be handled while being distinguished from each other, it is possible to add different related expressions to the keywords having the same notation according to the features of the UP or the CP.

2. Modified Example

Next, a modified example of the above embodiment of the present technology will be described.

The above description shows an example in which an input expression and the expression appearance position IDs, the assignment degree vectors, and the scores of respective related expressions are output as the search results of the related expressions from the output unit 37 together with the related expressions. However, it is possible to appropriately omit the input expression, the assignment degree vectors, and the scores when they are not used in subsequent processing.

In addition, for example, instead of assignment degree vectors, information indicating clusters corresponding to the assignment degree vectors having components of a prescribed threshold or more, i.e., information indicating clusters to which related expressions are highly likely to belong may be output.

In addition, for example, the expression feature amounts of related expressions may be output from the output unit 37.

Moreover, the search processing unit 21 and the application unit 22 does not necessarily need to be provided in the same apparatus and may be provided in different apparatuses.

Although the above description shows an example of a case in which English documents are processed, the present technology may also be applied to cases in which documents in any other languages such as Japanese are processed.

(Configuration Example of Computer)

The above series of processing may be executed not only by hardware but also by software. When the series of processing is executed by software, a program constituting the software is installed in a computer. Here, the examples of the computer include a computer incorporated in dedicated hardware and a general-purpose personal computer capable of executing various functions with various programs installed therein.

Figure 18:
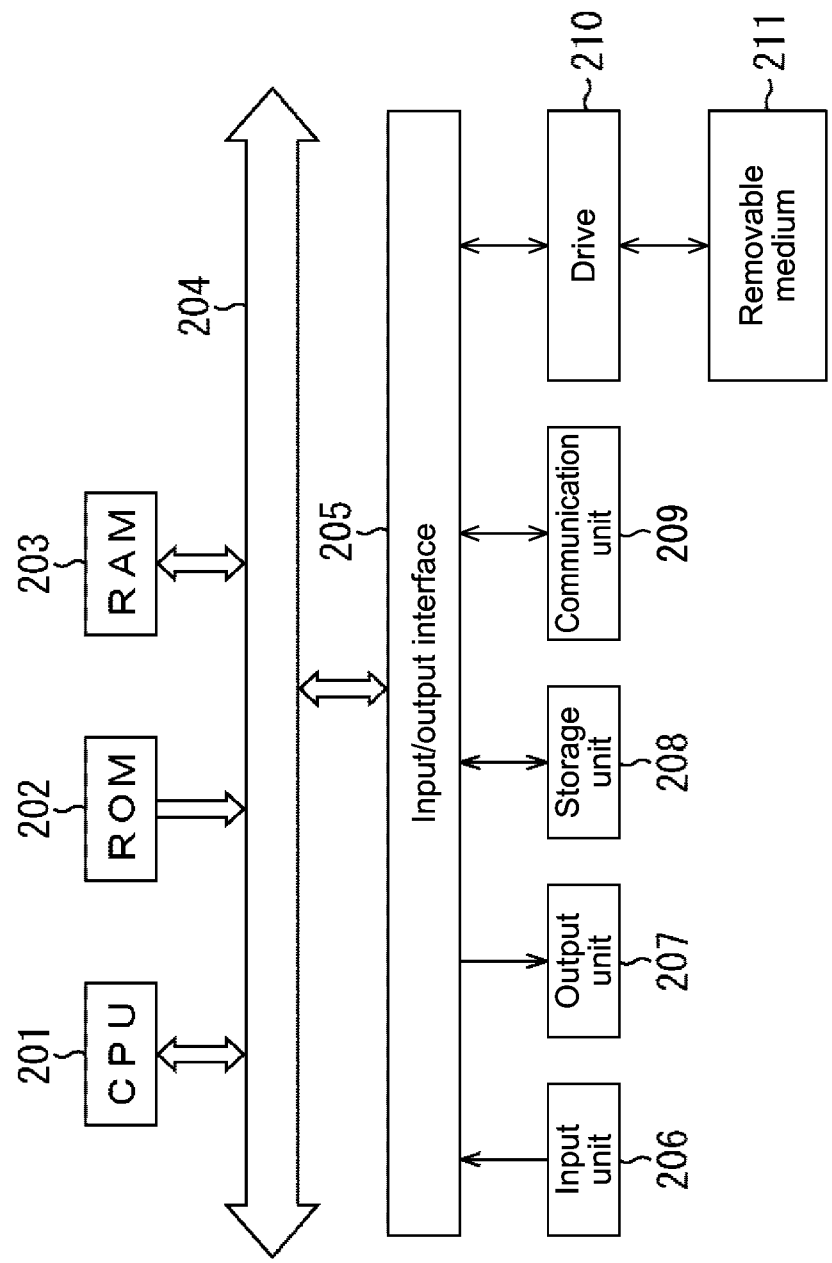
FIG. 18 is a block diagram showing a configuration example of a computer.

FIG. 18 is a block diagram showing a configuration example of the hardware of a computer that executes the above series of processing with a program.

In the computer, a CPU (Central Processing Unit) 201, a ROM (Read Only Memory) 202, and a RAM (Random Access Memory) 203 are connected to one another by a bus 204.

The bus 204 is also connected to an input/output interface 205. The input/output interface 205 is connected to an input unit 206, an output unit 207, a storage unit 208, a communication unit 209, and a drive 210.

The input unit 206 includes a keyboard, a mouse, a microphone, or the like. The output unit 207 includes a display, a speaker, or the like. The storage unit 208 includes a hard disk drive, a non-volatile memory, or the like. The communication unit 209 includes a network interface or the like. The drive 210 drives a removable medium 211 such as a magnetic disk, an optical disk, a magneto-optical disk, and a semiconductor memory.

In the computer thus configured, the above series of processing is executed, for example, when the CPU 201 loads a program stored in the storage unit 208 into the RAM 203 and executes the same via the input/output interface 205 and the bus 204.

For example, the program to be executed by the computer (CPU 201) may be provided in a state of being recorded on the removable medium 211 serving as a package medium or the like. In addition, the program may be provided via a wired or wireless transmission medium such as a local area network, the Internet, and digital satellite broadcasting.

In the computer, the program may be installed in the storage unit 208 via the input/output interface 205 when the removable medium 211 is attached to the drive 210. In addition, the program may be received by the communication unit 209 via a wired or wireless transmission medium and installed in the storage unit 208. Besides, the program may be installed in advance in the ROM 202 or the storage unit 208.

Note that the program to be executed by the computer may be a program to be executed chronologically in the order described in the specification or may be a program to be executed in parallel or at adequate timing such as when the program is invoked.

In addition, in the specification, a system represents a set of a plurality of constituents (such as an apparatus and modules (units)), and all the constituents may not be incorporated in the same housing. Accordingly, any of a plurality of apparatuses accommodated in different housings and connected to one another via a network and an apparatus having a plurality of modules accommodated in a housing is defined as a system.

Moreover, the embodiment of the present technology is not limited to the above one and may be modified in various ways without departing from the gist of the present technology.

For example, the present technology may have the configuration of cloud computing in which a function is shared and cooperatively processed by a plurality of apparatuses via a network.

In addition, each of the steps described in the above flowcharts may be executed by a single apparatus or may be shared and executed by a plurality of apparatuses.

Moreover, when a step includes a plurality of processing, the plurality of processing included in the step may be executed by a single apparatus or may be shared and executed by a plurality of apparatuses.

Furthermore, the present technology may employ, for example, the following configurations:

(1) An information processing apparatus, including:

an expression extraction unit configured to extract a plurality of expressions from a plurality of documents;

a feature extraction unit configured to extract feature amounts of the extracted respective expressions while distinguishing the expressions having the same notation from each other;

a clustering unit configured
   to cluster the extracted respective expressions together while distinguishing the expressions having the same notation from each other and
   to calculate assignment degree vectors having assignment degrees of the respective expressions to two or more respective clusters as components;
a related expression extraction unit configured to extract related expressions having the assignment degree vectors similar to the assignment degree vectors of a provided input expression while distinguishing the expressions having the same notation from each other; and
an output unit configured to output the related expressions and identification information for identifying the related expressions.

(2) The information processing apparatus according to (1), in which
the output unit is configured to further output at least one of the assignment degree vectors of the related expressions and scores expressing similarity in the assignment degree vectors between the related expressions and the input expression.

(3) The information processing apparatus according to (2), further including
a synonym extraction unit configured
   to add together the scores of the related expressions having the same notation and
   to extract the related expression of which the score is higher as a synonym of the input expression.

(4) The information processing apparatus according to (3), in which
the synonym extraction unit is configured
   to weight and add together the assignment degree vectors of the related expressions having the same notation according to the scores and
   to divide, when the assignment degree vectors of the extracted synonym have components of a prescribed threshold or more, the synonym into pieces for each of the clusters corresponding to the components of the prescribed threshold or more.

(5) The information processing apparatus according to any one of (1) to (4), further including
a recommendation unit configured to recommend an item to a user, in which
the related expression extraction unit is configured to extract a related expression of a keyword related to the recommended item, and
the recommendation unit is configured to present the related expression of the keyword to the user together with the recommended item.

(6) The information processing apparatus according to (5), in which
the recommendation unit is configured to present feature amounts of the related expression of the keyword to the user together with the recommended item.

(7) The information processing apparatus according to any one of (1) to (6), further including
a recommendation unit configured to recommend an item to a user, in which
the related expression extraction unit is configured to extract a related expression of a keyword included in feature amounts of the user or feature amounts of the item, and
the recommendation unit is configured to add the related expression of the keyword to the feature amounts of the user or the feature amounts of the item.

(8) The information processing apparatus according to (7), in which
the recommendation unit is configured to further add feature amounts of the related expression of the keyword to the feature amounts of the user or the feature amounts of the item.

(9) The information processing apparatus according to any one of (1) to (8), in which
the related expression extraction unit is, when a plurality of input expressions are provided, configured to extract expressions as the related expressions,
   the expressions having the assignment degree vectors similar to either vectors obtained by adding together the assignment degree vectors for the plurality of input expressions or vectors obtained by multiplying together the assignment degree vectors for the plurality of input expressions for each of the components.

(10) The information processing apparatus according to any one of (1) to (9), in which
the identification information expresses a document from which the related expressions are extracted and a position in the document.

(11) The information processing apparatus according to any one of (1) to (10), in which
the feature amounts of the expressions include expressions extracted from vicinities of the expressions in the document from which the expressions are extracted.

(12) An information processing method, including:
extracting a plurality of expressions from a plurality of documents;
extracting feature amounts of the extracted respective expressions while distinguishing the expressions having the same notation from each other;
clustering the extracted respective expressions together while distinguishing the expressions having the same notation from each other and calculating assignment degree vectors having assignment degrees of the respective expressions to two or more respective clusters as components;
extracting related expressions having the assignment degree vectors similar to the assignment degree vectors of a provided input expression while distinguishing the expressions having the same notation from each other; and
outputting the related expressions and identification information for identifying the related expressions.

(13) A program for causing a computer to execute processing including:
extracting a plurality of expressions from a plurality of documents;
extracting feature amounts of the extracted respective expressions while distinguishing the expressions having the same notation from each other;
clustering the extracted respective expressions together while distinguishing the expressions having the same notation from each other and calculating assignment degree vectors having assignment degrees of the respective expressions to two or more respective clusters as components;
extracting related expressions having the assignment degree vectors similar to the assignment degree vectors of a provided input expression while distinguishing the expressions having the same notation from each other; and
outputting the related expressions and identification information for identifying the related expressions.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a processor configured to:
obtain an input expression;
extract, based on the input expression, a plurality of expressions and a plurality of expression feature amounts from a plurality of documents,
wherein the plurality of expression feature amounts is associated with the plurality of expressions,
wherein a first expression of the plurality of expressions is distinguished from a second expression of the plurality of expressions based on respective expression feature amounts of the first expression and the second expression, and
wherein the first expression and the second expression have a same notation;
cluster the plurality of expressions based on the plurality of expression feature amounts;
calculate a plurality of assignment degree vectors for the plurality of expressions based on an average value of first assignment degree vectors of the input expression,
wherein each of the plurality of assignment degree vectors comprises a plurality of assignment degrees of a respective expression of the plurality of expressions, and
wherein the assignment degree vectors include features common to the plurality of expressions;
determine related expression candidates, from the plurality of expressions, based on the input expression;
calculate a first score for each of the related expression candidates based on comparison between the related expression candidates and the input expression;
extract, from the plurality of expressions, a set of related expressions of a plurality of related expressions based on the calculated first score,
wherein the set of related expressions has second assignment degree vectors;
integrate the set of related expressions into at least one expression, wherein each of the set of related expressions has the same notation;
determine a combined score for the at least one expression based on an addition of scores of the set of related expressions;
determine combined assignment degree vectors for the at least one expression based on a weighted addition of the second assignment degree vectors of the set of related expressions;
extract, as a synonym of the input expression, an expression from the set of related expressions based on each of the combined score for the at least one expression and the combined assignment degree vectors for the at least one expression;
recommend at least one item based on the extracted expression of the set of related expressions; and
transmit information to a user device, wherein the information comprises the at least one item, the at least one expression, the related expression, the combined assignment degree vectors, and the combined score to the user device,
wherein the transmitted information is displayed on a display screen of the user device.

2. The information processing apparatus according to claim 1, wherein the processor is further configured to output the second assignment degree vectors and a second score that expresses similarity in the assignment degree vectors of the related expression and the assignment degree vectors of the input expression.

3. The information processing apparatus according to claim 2, wherein the processor is further configured to:
add a plurality of scores associated with the plurality of related expressions,
wherein each of the plurality of related expressions has the same notation, and
wherein the extracted expression of the plurality of related expressions has a highest score among the plurality of scores.

4. The information processing apparatus according to claim 3, wherein the processor is further configured to
determine at least two clusters corresponding to the synonym, based on whether components of the combined assignment degree vectors associated with the synonym is greater than a threshold.

5. The information processing apparatus according to claim 1,
wherein the processor is further configured to:
recommend an item to a user associated with the user device;
extract a related expression of a keyword related to the recommended item; and
present the related expression of the keyword to the user together with the recommended item.

6. The information processing apparatus according to claim 5, wherein the processor is further configured to present feature amounts of the related expression of the keyword to the user together with the recommended item.

7. The information processing apparatus according to claim 1,
wherein the assignment degree vectors of a related expression is similar to either a first vector obtained by an addition of assignment degree vectors for a plurality of input expressions or a second vector obtained by a multiplication of the assignment degree vectors for the plurality of input expressions.

8. The information processing apparatus according to claim 1,
wherein the transmitted information expresses a document, of the plurality of documents, from which a related expression is extracted and a position in the document.

9. The information processing apparatus according to claim 1,
wherein the feature amounts of the plurality of expressions are based on the plurality of documents from which the plurality of expressions are extracted.

10. The information processing apparatus according to claim 1, wherein the processor is further configured to:
recommend an item to a user associated with the user device;
extract a related expression of a keyword included in at least one of expression feature amounts of the user or expression feature amounts of the item; and
add the related expression of the keyword to at least one of the expression feature amounts of the user or the expression feature amounts of the item.

11. The information processing apparatus according to claim 10, wherein the processor is further configured to add expression feature amounts of the related expression of the keyword to at least one of the expression feature amounts of the user or the expression feature amounts of the item.

12. An information processing method, comprising:
extracting, based on an input expression, a plurality of expressions and a plurality of expression feature amounts from a plurality of documents,
  wherein the plurality of expression feature amounts is associated with the plurality of expressions,
  wherein a first expression of the plurality of expressions is distinguished from a second expression of the plurality of expressions based on respective expression feature amounts of the first expression and the second expression, and
  wherein the first expression and the second expression have a same notation;
clustering the plurality of expressions based on the plurality of expression feature amounts;
calculating a plurality of assignment degree vectors for the plurality of expressions based on an average value of first assignment degree vectors of the input expression,
  wherein each of the plurality of assignment degree vectors comprises a plurality of assignment degrees of a respective expression of the plurality of expressions, and
  wherein the assignment degree vectors include features common to the plurality of expressions;
determining related expression candidates, from the plurality of expressions, based on the input expression;
calculating a score for each of the related expression candidates based on comparison between the related expression candidates and the input expression;
extracting, from the plurality of expressions, a set of related expressions of a plurality of related expressions based on the calculated score,
  wherein the set of related expressions has second assignment degree vectors;
integrating the set of related expressions into at least one expression, wherein each of the set of related expressions has the same notation;
determining a combined score for the at least one expression based on an addition of scores of the set of related expressions;
determining combined assignment degree vectors for the at least one expression based on a weighted addition of the second assignment degree vectors of the set of related expressions;
extracting, as a synonym of the input expression, an expression from the set of related expressions based on each of the combined score for the at least one expression and the combined assignment degree vectors for the at least one expression;
recommending at least one item based on the extracted expression of the set of related expressions; and
transmitting information to a user device, wherein the information comprises the at least one item, the at least one expression, the related expression, the combined assignment degree vectors, and the combined score,
  wherein the transmitted information is displayed on a display screen of the user device.

13. A non-transitory computer-readable medium having stored thereon computer executable instructions that, when executed by a processor, cause a computer to execute operations, the operations comprising:
extracting, based on an input expression, a plurality of expressions and a plurality of expression feature amounts from a plurality of documents,
  wherein the plurality of expression feature amounts are associated with the plurality of expressions,
  wherein a first expression of the plurality of expressions is distinguished from a second expression of the plurality of expressions based on respective expression feature amounts of the first expression and the second expression, and
  wherein the first expression and the second expression have a same notation;
clustering the plurality of expressions based on the plurality of expression feature amounts;
calculating a plurality of assignment degree vectors for the plurality of expressions based on an average value of first assignment degree vectors of the input expression,
  wherein each of the plurality of assignment degree vectors comprises a plurality of assignment degrees of a respective expression of the plurality of expressions; and
  wherein the assignment degree vectors include features common to the plurality of expressions;
determining related expression candidates, from the plurality of expressions, based on the input expression;
calculating a score for each of the related expression candidates based on comparison between the related expression candidates and the input expression;
extracting, from the plurality of expressions, a set of related expressions of a plurality of expressions based on the calculated score,
  wherein the set of related expressions has second assignment degree vectors;
integrating the set of related expressions into at least one expression, wherein each of the set of related expressions has the same notation;
determining a combined score for the at least one expression based on an addition of scores of the set of related expressions;
determining combined assignment degree vectors for the at least one expression based on a weighted addition of the second assignment degree vectors of the set of related expressions;
extracting, as a synonym of the input expression, an expression from the set of related expressions based on each of the combined score for the at least one expression and the combined assignment degree vectors for the at least one expression;
recommending at least one item based on the extracted expression of the set of related expressions; and
transmitting information to a user device, wherein the information comprises the at least one item, the at least one expressions, the related expression, the combined assignment degree vectors, the combined score,
  wherein the transmitted information is displayed on a display screen of the user device.

* * * * *